April 20, 1965   R. A. HANSON ET AL   3,178,874
LAWN MOWER
Filed Aug. 31, 1962   2 Sheets-Sheet 1
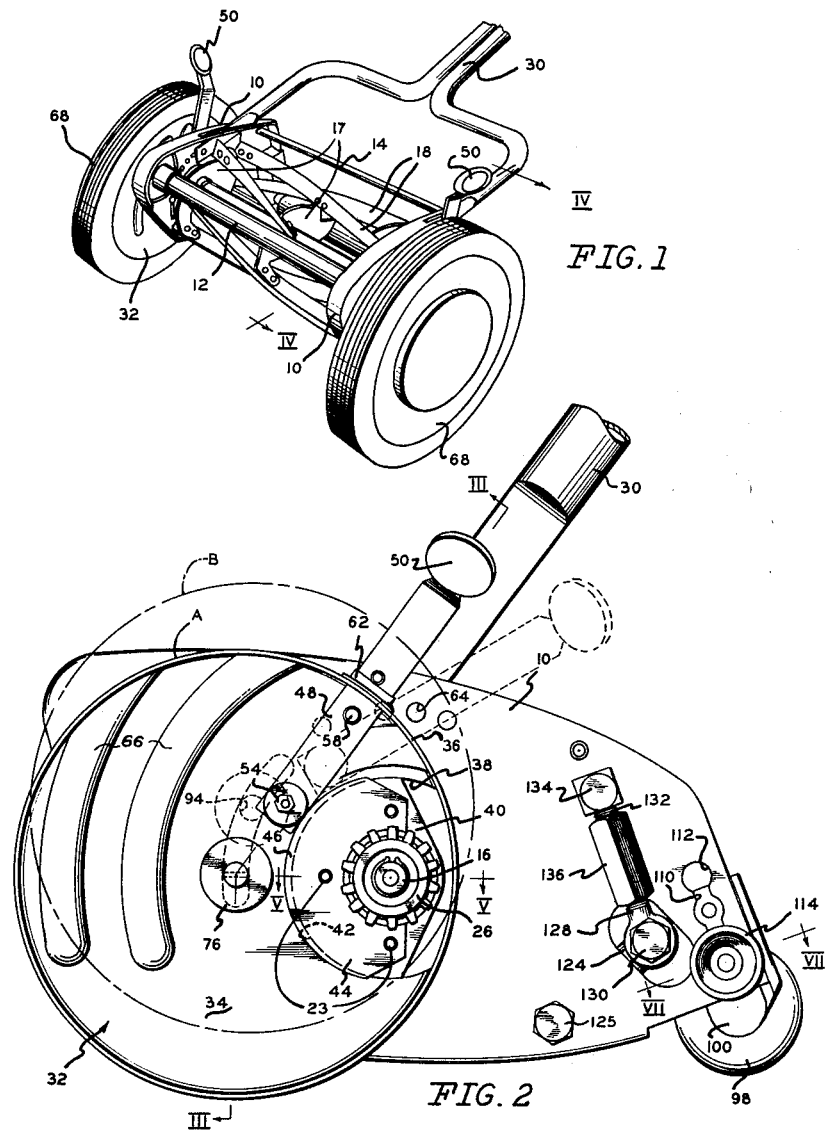
FIG. 1
FIG. 2
FIG. 5
INVENTORS
RUDOLPH A. HANSON
EDWARD J. ZIEGLER
JOHN E. FISCHER
JOHN R. WEST
BY 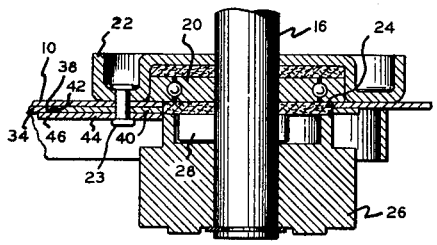
ATTORNEY April 20, 1965   R. A. HANSON ET AL   3,178,874
LAWN MOWER
Filed Aug. 31, 1962   2 Sheets-Sheet 2

INVENTOR
RUDOLPH A. HANSON
EDWARD J. ZIEGLER
JOHN E. FISCHER
BY JOHN R. WEST
Beaman & Beaman
ATTORNEY though not limited to, reel type lawn mowers and more specifically relates to adjustment of mower wheels and/or roller relative to the frame of the mower.

United States Patent Office 3,178,874
Patented Apr. 20, 1965

3,178,874
LAWN MOWER
Rudolph A. Hanson, Edward J. Ziegler, and John E. Fischer, Jackson, Mich., and John R. West, Marysville, Ohio; said Hanson, said Ziegler and said Fischer assignors to Yard-Man, Inc., Jackson, Mich., a corporation of Michigan, and said West assignor to The O. M. Scott & Sons Company, Marysville, Ohio, a corporation of Ohio
Filed Aug. 31, 1962, Ser. No. 220,628
6 Claims. (Cl. 56—254)

This invention relates to mower height adjustment structure particularly adaptable with, though not limited to, reel type lawn mowers and more specifically relates to adjustment of mower wheels and/or roller relative to the frame of the mower.

With an increased demand for more convenient and versatile implements for use in lawn care, it has become necessary to develop and provide lawn mowers which are capable of being easily adjusted to produce the desired cutting characteristics. An important lawn mower adjustment is that of regulating the height of the cut whereby the operator may vary the cutting height in accordance with the ground conditions, weather, type of grass being cut and desired lawn texture. There are many previously known devices for adjusting the height of a lawn mower cut shown in the prior art although most such devices require the use of wrenches and accomplish adjustment by means of changing the roller position while no previously known mower is equipped to accomplish the adjustment in the fast, convenient and accurate manner of the present invention.

Accordingly, it is a primary object of this invention to provide an improved, convenient, fast and easily operable lawn mower heigh cutting adjustment which will rigidly maintain the desired adjustment and yet provide optimum cutting characteristics and ease of operation. To such end, adjustment means are provided for vertical variable positioning of the drive wheel axles, relative to the axis of the reel shaft, on the supporting frame member, supplemented if desired by easily actuated auxiliary adjustment means associated with the ground roller whereby tilting of the frame members, upon adjusting of the drive wheels, can be alleviated or prevented.

A further object resides in the provision of adjustable support structure for adjustably mounting the wheels of a lawn mower to the mower frame with quick release latch devices wherein the structure is of a strong and rigid construction, yet is easily produceable and economical to manufacture.

A further object of the invention is to provide lawn mower structure wherein mounting members for any mower wheels including drive wheels are adjustable relative to the supporting frame member and the assembly of the wheel mounting members to the frame structure is rigidly maintained and easily accomplished, yet will not become accidentally disassembled.

In conjunction with the foregoing object, still another object resides in the provision of an adjustable wheel mount structure which also serves as the inner wheel housing.

A further object of the invention is to provide an auxiliary ground roller height adjustment which is simple and positive in its operation whereby the brackets which rotatably support the ground roller are maintained in frictional engagement with the frame member, and guide means are associated with the frame member and bracket for guiding the direction of movement of the bracket, during adjustment.

These and other objects of the invention arising from the details and relationships of the components of an embodiment thereof will be apparent from the following description and accompanying drawings wherein:

FIGURE 1 is a perspective view of a reel type lawn mower constructed in accordance with the invention, a portion of the handle being deleted;

FIGURE 2 is a side elevational view of the lawn mower shown in FIGURE 1 with the drive wheel removed from its axle, and illustrates the manner, in which the wheel mounting plates, which also serve as the inner wheel housings, are eccentrically pivotally journalled on the associated side frame member, the phantom lines being included to provide a clear understanding of the manner in which the wheel mounting plate is shifted;

FIGURE 5 is an enlarged detail section, taken on line V—V of FIGURE 2, illustrating the reel shaft bearing structure and shows the cooperation of the wheel mounting member journal portion with the complementary journal plate on the frame;

Figure 4:
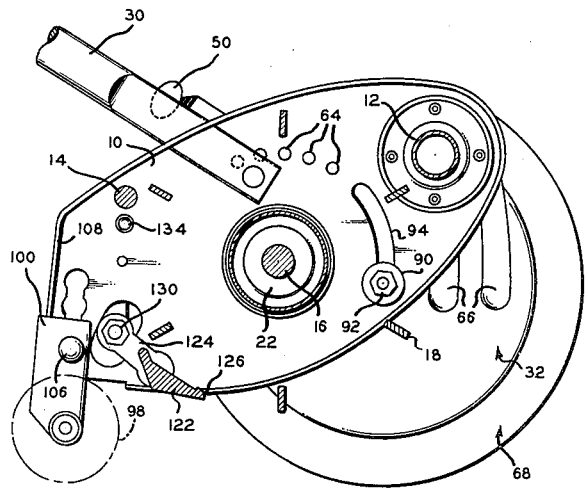
FIGURE 4 is an elevational section, taken along line IV—IV of FIGURE 1, illustrating the inner side of a frame member.

FIGURE 1 illustrates the general appearance of a reel type lawn mower incorporating the components of the invention. The lawn mower frame consists of a pair of parallel spaced apart side frame members 10 of generally vertically planar configuration having a substantial portion of their peripheries deflected inwardly to define reinforcing flanges. The two frames 10 are maintained in a spaced apart rigid relationship by a pair of elongate spacing members 12 and 14 rigidly affixed, as by rivets or the like, to the planar wall of the frame member 10. A reel shaft 16 has several spiders 17 which mount a plurality of blades 18, the shaft 16 being rotatably journalled within bearings 20, see FIGURE 5, mounted upon the inside of the frame members within cupped bearing housings 22. The bearing housings are secured to frame 10 by rivets 23, to which further reference will be made hereinafter. The ends of the reel shaft 16 project through openings 24 in the mid portion of the frame members and a pinion 26 is drivingly connected thereto by a unidirectional clutch 28 in the known manner. A handle 30, in a conventional manner is pivotally affixed to the two frame members 10 for pushing and guiding the mower. The above described structure is essentially conventional with this reel type of lawn mower.

A right-hand and a left-hand combination drive wheel support bracket or mounting member 32 are made circular in order to also serve as inner wheel housings. Other than being right and left hand parts, both support brackets have a similar configuration and only one need be described. Each wheel support bracket 32 is rotatably, eccentrically journalled on the outer surface of an associated frame member 10 about the axis of the reel shaft 16. The wheel support brackets 32 are preferably constructed of a steel sheet metal stamping with a generally planar portion 34, FIGURE 3, having surface engagement with the outer surface of the associated frame member 32. The circular wheel support, also serving as the inner wheel housing, has its periphery flanged at 36 to provide a cylindrical projection receivable within a circular groove in the inner side of the associated drive wheel tire, as clearly shown in FIGURE 3, serving as a debris, and dust shield for the mower drive gears. The wheel support 32 is provided with an eccentrically located opening 38 with a partially circular configuration, as will be apparent from FIGURE 2.

Each wheel support 32 is mounted for pivotal shift upon the associated frame member 10 by means of a planar plate segment 40 rigidly secured, by the reel bearing cup rivets 23 against the outer planar surface of the frame member. Segment 40 has a cylindrical sector peripheral surface 42 which substantially corresponds in dimension, through slightly less, to the eccentric circular opening 38 in the wheel supports 32. The cylindrical sector surface 42 of segment 40 constitutes a journal surface concentrically related to the axis of the reel shaft 16. An arcuate plate 44 is so placed over the segment 40, also being rigidly secured by the reel bearing cup rivets 23, whereby a portion of the plate 44 extends radially beyond the cylindrical journal surface 42 of the segment 40 to form a retaining lip 46, see also FIGURE 5. For assembling a wheel support 32 on its associated frame 10, the opening 38 in the support 32 will provide sufficient play so that upon initial placement of the support 32 slightly to the left, FIGURE 2, the opening 38 may be slipped over the retaining plate 44 to clear the leftmost edge or the lip 46 of the plate. The wheel support 32 can then be moved to the right into assembled relationship, whereby the peripheral portion of the journal opening 38 in support 32 abuts the mating cylindrical journal surface 42 of segment 40 and will be interposed between the retaining plate lip 46 and the surface of frame member 10, as will be apparent from FIGURE 5. This arrangement eccentrically journals and partially axially retains the wheel support member 32 upon the associated frame member 10 on a large bearing surface concentric with the axis of the reel shaft 16 and pinion 26 mounted thereon. An arcuate slot 94 in each frame member 10 is made coaxial with the reel axis and, as will now be described, through cooperative relationship with wheel stub axles 76, will radially retain the housing support 32 in pivoted disposition on the cylindrical sector 42 of segment 40 and completes the axial retention of the support 32 against the frame 10.

Figure 3:
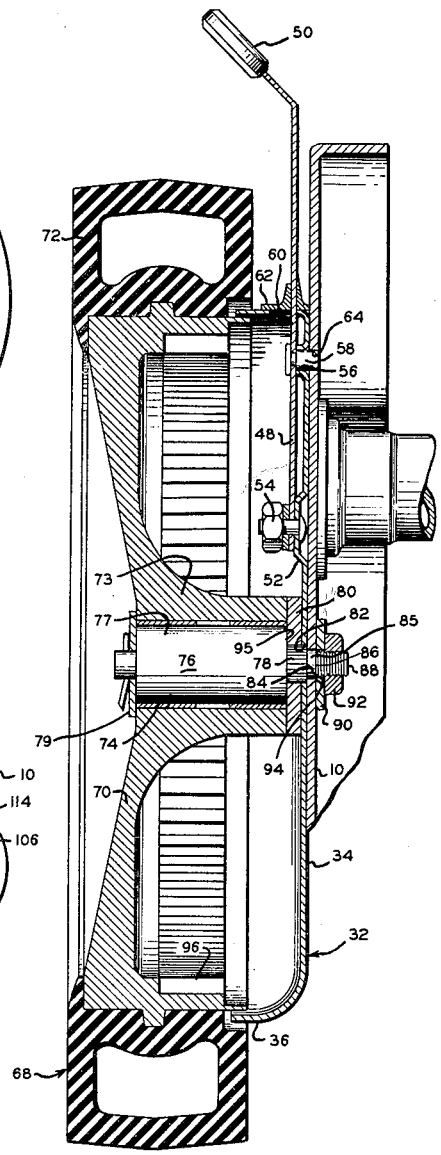
FIGURE 3 is an enlarged detail section taken along line III—III of FIGURE 2 with the drive wheel in assembled position.

The construction of the drive wheels 68 is best illustrated in FIGURE 3. Each wheel 68 is identical and includes a rimmed hub 70, having a tread member 72 of resilient material affixed to the rim periphery thereof. The hub is provided with a central boss 73 with a through bore 74 by which the wheel is rotatably mounted upon an enlarged journal portion 77 of a stub axle member 76. A washer 79 and cotter pin retain the wheel on the axle. Axle 76 has a stepped cylindrical configuration with a first, reduced radius, splined portion 78 for non-rotatably affixing the axle within the hole through a heavy thrust washer 80 which is welded to the center of the planar portion 34 of wheel support 32 concentric with a hole 82 through the support 32. A shoulder 84 at the end of the splined portion 78, in assembly, is essentially flush with the surface of housing support 32 and will bear upon the outer surface of the frame member. A further reduced portion 85 of the axle projects through the arcuate support slot 94 and terminates at a second shoulder 86 adjacent a threaded terminal portion 88 of the axle. Shoulder 86 is substantially coplanar with the inside surface of the frame member 10 whereby a washer 90 may be drawn up snug against the shoulder 86 and in a close but loose engagement with frame member by a nut 92 without clamping the washer 90 and the frame member 10 against the housing support 32. The axial dimension of intermediate axle portion 85 is just sufficient to permit a slideable relationship to exist between the stub axle 76 and arcuate slot 94 in the frame member for the desired pivotal adjustment of the drive wheel support brackets 32 relative to the frame members 10. Note that the axles are fixedly located in the housing support members 32 and cooperate with the sides of the arcuate slot 94 to maintain the housing support member 32 pivotally engaged with the cylindrical journal sector 42 of segments 40 and under the lip of associated retaining plates 44. The close sliding relationship between each wheel housing support member 32 and the associated frame member 10 produced by the fixed relationship of the washer 90 relative to axle shoulders 84 and 95 (adjacent the axle journal 77) permits the axle 76 to impose much of its weight bearing forces directly to the frame member.

Figure 8:
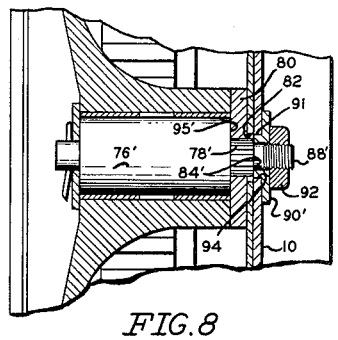
FIGURE 8 is a detail section similar to that of FIGURE 3 to illustrate a preferred embodiment of the axle mounting components.
Figure 6:
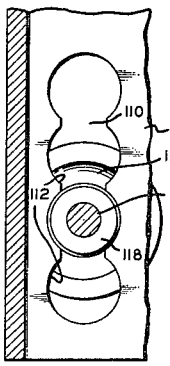
FIGURE 6 is an enlarged detail section, taken along line VI—VI of FIGURE 7, illustrating the ground roller adjustment slot and cooperating adjustment nut.

Turning momentarily to FIGURE 8, an alternative axle mounting arrangement, which is a preferred production embodiment will be described. The axle 76' is, in essence, identical to axle 76 having shoulders 84' and 95' corresponding to shoulders 84 and 95. However, instead of using a spacing portion such as 85, a stepped washer bushing 90' is used in lieu of washer 90. The reduced bushing projection 91 of washer 90' has a very slightly greater dimension than the wall thickness of frame 10 and provides a close sliding relationship of the axle 76' in the arcuate frame slot 94, and maintains the support 32 against the frame in a close sliding relationship, similar to the intermediate portion 85 of axle 76.

An internal ring gear 96, secured within or integral with the peripheral rim flange of wheel hub 70, has teeth which mesh with the teeth of the adjacent reel shaft pinion gear 26 and provide a driving connection between the drive wheel and the pinion.

The structure described to this point covers a wheel support, securely fixed against the side frames but shiftable through a path permitted by the length of arcuate slot 94. The releasable latch means which fixes the wheel supports in different pivotally shifted positions will now be described with reference to FIGURES 2 and 3.

An adjustment lever 48, having a readily accessible handle portion 50 extending above the upper edge of frame 10, is constructed as a spring leaf. One lever is attached to each wheel support structure 32, as will now be described. A portion 52 of the support structure 32 is indented to permit a nut and bolt assembly 54 to rigidly fasten the lower end of the lever 48 to the support, the bolt head being disposed in the indented recess 52 so that the bolt head will not interfere with the frame member 10 during adjustment shift of the wheel support. The wheel support 32 is pierced at 56 to provide a flanged hole which serves as a guide for a cylindrical detent or latch pin 58 which is rigidly affixed, as by swaging, to an intermediate portion of lever 48, spaced away from the bolt 54. A slot 60 in the circumferential flange portion 36 of the wheel support 32 permits the handle portion of the lever to extend radially upward beyond the periphery of the wheel. The slot has a dimension of sufficient width in an axial sense to permit the leaf spring lever to be substantially flexed to the left, as viewed in FIGURE 3. A cover member or grommet 62 is preferably placed on the lever to cover the slot 60 and prevent entrance of debris and dirt into the wheel housing. The lower end of the lever 48 is preferably initially slightly offset with respect to the general plane of the lever whereby upon tightening of the nut and bolt assembly 54 and drawing the lower end of the lever into intimate clamped engagement with the housing, the offset portion will tend to bias the lever and its detent pin 58 toward the right, as viewed in FIGURE 3, producing a spring bias in the lever 48 and normally maintaining the detent or latch pin 58 projected through the support bracket hole 56 and into a selected one of a group of adjustment holes 64 formed in the frame member.

A plurality of the detent or latch pin receiving holes 64 in the planar portion of frame members 32 are arranged in a circular arc concentric with the axis of the reel shaft. The holes 64 are spaced apart from each other so such that shifting of the support bracket 32 to move the detent or latch pin 58 from one hole to the adjacent hole will provide a desired increment of adjustment of the cutter blade height above ground level by shifting the location of the wheel axle 76 relative to frame 10 about the reel axis; for example, the spacing could provide a ¼" change of height for each increment of adjustment. In FIGURE 2, five (5) adjustment holes 64 are shown and the solid line illustration A of the support 32 shows the next to highest cutting height, whereas the phantom lines B show the repositioned support structure 32 when the latch or detent pin has been shifted to the next to lowest cutting height.

FIGURE 2 also illustrates recessed arcuate grooves 66 formed in the planar portion 34 of the wheel support. Grooves 66 are provided to avoid interference of the wheel support 32 with the rivets extending through the frame members 10 and attaching the front tubular spacing member 12 to the frame members.

Adjustment of the drive wheels is accomplished by merely grasping the lever 48 at the upper handle end portion 50 and moving the lever in a direction toward the associated wheel. This will flex the lever and remove the detent or latch pin 58 from the associated adjustment hole 64. After removing the pin 58 from a hole 64, the entire wheel support 32 with its wheel assembly 68 may be swung either upwardly or downwardly in an arc about the axis of the reel shaft, thereby raising or lowering the drive wheel 68 relative to the frame members 10. Upon positioning the drive wheel 68 at a desired level, the lever 48 is released to permit the detent pin 58 to be received within a desired, and aligned, adjustment hole 64 and the height adjustment is accomplished. A similar adjustment, of course, is made for both wheels. In that the drive wheel and its support pivot on a fixed radius about the axis of the reel shaft, the adjustment will not effect the engagement between the gear teeth of the wheel hub ring gear 96 and the reel shaft pinion 26.

When cutting height is changed to a considerable degree by adjusting the drive wheels, it may be desirable to also adjust the ground roller 98 so that the resultant height adjustment of the cutter bar 122 will not adversely affect the proper angular relationship of the cutter bar to the grass being cut. Optimum cutting is achieved at a relatively limited angular relation of the cutter bar to the grass whereby the reel blades will effectively cut the grass rather than knock the grass down prior to its reaching the cutter bar.

The ground roller 98 is rotatably mounted on a bracket 100 at each end of the roller. The brackets 100 are of a relatively elongated configuration, having an elongated groove or recess 102 defined therein adjacent one of the longitudinal edges. A hole 104 is located within the bracket for receiving a threaded pin or bolt 106.

The rear edge of each of the frame members 10 is provided with an inwardly turned straight edge flange 108 substantially perpendicularly disposed to the general plane of the frame member, and the flange is of such configuration as to be slideably received within the bracket groove 102. The cooperating flange and groove relationship functions as a guide to enable a linear movement of the bracket 100 to facilitate its adjustment up and down relative to the frame 10.

Figure 7:
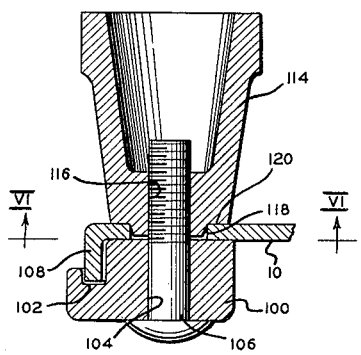
FIGURE 7 is an enlarged detail section, taken on line VII—VII of FIGURE 2, illustrating the ground roller adjustment knob and bracket.

A slot 110 is made in each frame member adjacent its rear edge flange 108 and substantially parallel to the flange. The slots 110 are provided with a plurality of holes or recesses 112 of enlarged dimension, axially spaced along and symmetrical with respect to the longitudinal axis of the slot. The holes 112 are circular in configuration and the slot 110 is of a width slightly greater than the diameter of the bolt 106, and enables the threaded bolt to freely project therethrough. A nut 114, in the form of a knob in the illustrated embodiment, is provided with a threaded bore 116 for operatively associating with the threads of the bolt. The end of the knob nut 114 provided with a slightly conical pilot projection 118, concentric to the threaded bore 116, to be closely received within the holes 112 in slot 110. A shoulder 120 on the knob nut 114, adjacent the pilot projection 118, engages against the frame member when the pilot projection 118 is fitted within a hole 112, as is shown in FIGURE 7.

Adjustment of the ground roller is accomplished by unscrewing the knob nut 114 sufficiently to withdraw the pilot projection 118 from the associated hole or recess 112. Thereupon the knob nut, bolt, bracket and roller may be shifted as a unit relative to the frame member to the desired new height position where the cylindrical pilot projection is aligned with another hole 112. The knob nut is then tightened upon the bolt, to place the projection 118 within the desired hole, by securely clamping the nut shoulder 120 in engagement with the outer surface of the frame member. Tightening of the knob nut will tension the bolt and maintain a tight frictional engagement of the bracket 100 with the inner surface of the frame member 10. The brackets at each end of the ground roller are adjusted in an identical manner.

Quick adjustment means are also provided for adjusting the cutter bar 122 relative to the reel blades 18. The cutter bar 122 is mounted at each end to the frame members 10 by means of a pivotal connection. Lever members 124, see FIGURE 4, pivotally mounted on the frame members 10 by bolts 125, see FIGURE 2, support the cutter bar structure whereby pivoting of the lever 124 will cause the forward cutting edge 126 of the cutter bar 122 to move substantially radially toward or away from the reel axis. The adjustment mechanism on each end of the cutter bar consists of a threaded eye stud 128 which has its eye pivotally connected to the associated cutter bar lever 124 by a pivot bolt 130. A second threaded stud 132 is pivotally affixed to the frame member by means of a swaged bracket 134. The threads formed upon the lower eye stud 128 are of an opposite hand with respect to the threads of the upper stud 132, and a turnbuckle nut member 136 having adjacent sections of its bore threaded in opposite hands is interposed between the studs in threaded engagement with the stud threads. Upon rotation of the turnbuckle nut member 136, the associated end of the cutter bar lever 124 is pivoted for adjustment of the cutter bar relative to the reel blades.

From the foregoing description it will be appreciated that the invention is directed to adjustment features for lawn mowers which are economical to manufacture, may be easily operated by unskilled operators without requiring special tools, and that a rugged and substantial lawn mower construction is possible without the need of expensive castings and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a lawn mower, in combination, a frame member having inside and outside surfaces, a reel shaft rotatably mounted upon said frame member, an opening defined in said frame member receiving an end of said shaft and a pinion gear mounted upon and drivingly associated with the shaft end, a cylindrical surface defined on said frame member adjacent said outside surface and concentric with said reel shaft, a drive wheel mounting member with an opening defined therein having a cylindrical peripheral portion complementary to said cylindrical surface, an arcuate slot defined in said frame member concentric with said reel shaft, fastener means mounted on said mounting member received within said slot maintaining said mounting member contiguous to said frame outside surface upon intermating said mounting member opening with said cylindrical surface, a shoulder defined upon said frame member adjacent to and radially extending beyond said cylindrical surface spaced from said outside surface a distance substantially equal to the thickness of the cylindrical portion of the wheel mounting member whereby a portion of said wheel mounting member is interposed between said outside frame surface and said shoulder, a drive wheel rotatably mounted upon said mounting member and having gear teeth associated therewith drivingly associated with the adjacent pinion gear, and releasable locking means mounted upon said mounting member selectively engagable with positioning means defined on said frame member for selectively pivotally positioning said mounting member relative to said frame member about the axis of the reel shaft.

2. A lawn mower as defined in claim 1, wherein a plate is affixed to said frame member adjacent to said opening defined therein, said cylindrical surface being defined on said plate.

3. A lawn mower as defined in claim 1, wherein a first plate is affixed to said frame member adjacent to said opening defined therein, said cylindrical surface being defined on said plate, and a second plate affixed to said first plate spaced from said frame outside surface having a portion radially extending from the shaft axis a greater distance than said cylindrical surface thereby defining said shoulder.

4. A lawn mower as defined in claim 1, wherein said releasable locking means comprises a spring leaf lever mounted on said wheel mounting member movable toward and away from said frame member and having an accessible manually operable handle portion defined thereon, a detent means defined on said lever, said positioning means comprising detent receiving openings defined in said frame member.

5. A lawn mower combination comprising a frame member, grass cutting means, rotatable ground engaging, frame supporting means including at least one wheel, a wheel mounting member adjacent said frame member, an axle fixed on said mounting member and rotatably carrying said wheel, pivot means securing said mounting member to said frame member permitting pivotal movement of said mounting member relative to said frame member in a planar path about an axis parallel to and offset from said wheel axle permitting a change of relative positioning between said cutting means and said wheel, means for latching said two members in selected ones of a plurality of positions within the range of said limited relative pivotal shifting movement of said members, said latching means comprising a plurality of latch lug embracing means defined on one of said members located along an arc concentric to the pivot axis and a latch lug secured to the other of said members by means of a leaf spring for pivotal shift relative to said other member in an arc equal and parallel to the arc of said latch lug embracing means, said leaf spring being mounted on said other of said members for biased movement in a direction parallel to said pivot axis to a position of engagement of said latch lug with said latch lug embracing means to prevent relative pivotal shift of said members, and an extension defined on said leaf spring to enable manual movement of said latch lug away from engagement with a lug embracing means to permit relative pivotal shift of said members.

6. A lawn mower combination comprising a frame member, grass cutting means, rotatable ground engaging, frame supporting means including at least one wheel, a circular plate constituting an inner wheel housing adjacent said frame member, an axle fixed on said plate and rotatably carrying said wheel, pivot means securing said plate to said frame member permitting pivotal movement of said plate relative to said frame member in a planar path about an axis parallel to and offset from said wheel axle permitting a change of relative positioning between said cutting means and said wheel, means for latching said frame member and said plate in selected ones of a plurality of positions within the range of said limited relative pivotal shifting movement of said frame member and plate, said latching means comprising a plurality of latch lug embracing means defined on said frame member located along an arc concentric to the pivot axis and a latch lug secured to said plate by means of a leaf spring for pivotal shift relative to said frame member in an arc equal and parallel to the arc of said latch lug embracing means, said leaf spring being mounted on said plate for biased movement in a direction parallel to said pivot axis to a position of engagement of said latch lug with said latch lug embracing means to prevent relative pivotal shift of said frame member and plate, and an extension defined on said leaf spring to enable manual movement of said latch lug away from engagement with a lug embracing means to permit relative pivotal shift of said frame member and plate.

References Cited by the Examiner
UNITED STATES PATENTS

| 2,260,801 | 10/41 | Clemson | 56—249 |
| 2,637,157 | 5/53 | Stegeman | 56—249 |
| 2,968,906 | 1/61 | Grimes | 56—249 |
| 3,044,240 | 7/62 | Grobowski | 56—254 |

T. GRAHAM CRAVER, *Primary Examiner.*

RUSSELL R. KINSEY, *Examiner.*

PO-1050
(5/69)

UNITED STATES PATENT OFFICE
CERTIFICATE OF CORRECTION

Patent No. 3,178,874  Dated April 20, 1965

Inventor(s) Rudolph A. Hanson, Edward J. Ziegler, John E. Fischer and John R. West.

It is certified that error appears in the above-identified patent and that said Letters Patent are hereby corrected as shown below:

Column 8, line 4, the word "other" should read --one--.

SIGNED AND
SEALED

SEP 30 1969

(SEAL)
Attest:

Edward M. Fletcher, Jr.

Attesting Officer

WILLIAM E. SCHUYLER, JR.
Commissioner of Patents